United States Patent Office 3,227,687
Patented Jan. 4, 1966

3,227,687
INTERNALLY PLASTICIZED PHENOLIC RESINS
Chester W. Fitko and Abraham Ravve, Chicago, Ill., assignors to Continental Can Company, Inc., New York, N.Y., a corporation of New York
No Drawing. Filed Mar. 20, 1961, Ser. No. 96,671
6 Claims. (Cl. 260—53)

This invention relates to the preparation of coating compositions and coatings on metal, and is more particularly concerned with the preparation of such materials with a base of internally plasticized phenol aldehyde resin.

Alkali-condensed phenol:aldehyde, or phenolic, resins yield coating compositions which can be readily applied in solution form to metal such as tin plate, which upon heating cure rapidly to insoluble form, and which then exhibit excellent adhesion. Such cured coatings are hard, non-staining and economical. However, the coatings are brittle, and crack when the coated metal sheet is fabricated, e.g., during the bending and stretching to form the sheet material into cans; and the broken film fragments will separate from the metal substrate.

Furthermore, enamels containing phenol-formaldehyde resins are very sensitive to impure metal surfaces, particularly when the surface is contaminated with oils or organic esters such as dioctyl sebacate. The enamel then tends to dewet readily; that is, uniform wetting is not attained.

Another serious drawback of enamels containing phenol-aldehyde resins is the poor flow-out or leveling behavior of the enamels upon roll-coating application on metal surfaces.

It has been sought to reduce this brittleness and improve flow-out and wetting by the addition of external plasticizers such as a co-soluble alkyd resin, ester gum or organic acetate: but when the proportion is effective to eliminate brittleness during fabrication, it also slackens the cure of the phenol aldehyde resin and provides a weaker, softer coating. Furthermore, such external plasticizers are present as components of physical mixtures, without chemical combination, and can leach out upon contact with the intended contents of some containers, particularly when a food product is involved and thermal processing is necessary for sterility. Furthermore, otherwise desirable external plasticizers often tend to be only partially compatible with phenolic resins, so that resin separation results.

It has been found that the difficulties can be avoided by internal plasticization of phenolic resins through the presence of aliphatic mono-substitutions at the benzene or phenyl nuclei, as taught and claimed in our copending application, Serial No. 57,624, filed September 22, 1960.

It has further been found that the desired effects can be gained by increasing the length of the linkage between adjacent nuclei of the same resole condensate, or by both increasing the linkage length and applying substitution to one or more such nuclei. In general, the strength across a B-stage resin group is high; the atoms are not rectilinearly arranged; but are three-dimensional branched structures of low molecular weight, which can be converted to the C-stage by combining together, e.g. by bridges at their methylol groups to form methylene or dimethylene ether groups. When the pure methylene bridges are formed, the resulting lattice of the cross-linked or C-stage resin is very tightly knit and there is little opportunity for relative atomic movement; that is, the cured resin is brittle and not flexible or resilient. Hence, increase of linkage length between the nuclei affords rotation and relative movement, so that there is flexibility and resilience; but without disruption or breakage of the links upon heating, as compared to the thermoplasticity and separation of molecules joined only by secondary or Van der Waal's forces.

The ammonia can be employed as such, or as ammonium hydroxide (the amount being calculated as ammonia), or otherwise whereby an excess is maintained to assure the production of the desired ·CH$_2$—NH·CH$_2$· groups during the condensation to the B-stage forms. The reaction can be effected by mixing the components, using say 100 parts by weight of simple phenol (monohydroxybenzene), with up to 50 parts by weight of alkylphenol, and employing three molecular weight ratios of formaldehyde (e.g. commercial aqueous solution known as formalin, computed as formaldehyde) per mole of simple and alkyl phenol, and three molecular weight ratios of ammonia (as ammonium hydroxide, 28% aqueous solution, computed as ammonia), and heating for 2 to 20 hours, with reflexing and stirring, at 80 to 100 degrees C.; followed by precipitating the B-stage resin, washing with water, drying, and taking up in volatile organic solvent for forming a liquid coating composition.

The interaction of phenol and formaldehyde yields resole or B-stage resins in which successive nuclei are connected by a methylene group, a ·CH$_2$·O· linkage, or the like; and the curing to resite or "C-stage" resins in which cross-linking by electron bonds occurs, and the product becomes infusible.

When a basic catalyst such as triethylamine or sodium hydroxide is present at the condensation, the alkali agent drives the reaction without becoming a part of the final product. Comparably, when ammonia is used as a catalyst in a phenol:aldehyde condensation, the resulting resin is less brittle apparently because the ammonia is not a true catalyst in the reaction, but portions thereof become a part of the product, as a secondary amine:

(1)

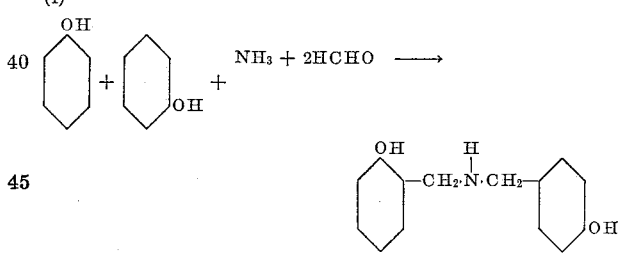

The longer linkage of the ·CH$_2$·NH·CH$_2$· group confers flexibility, and the cured enamel is considerably less brittle than the cured resin obtained when the linkage is of ·CH$_2$· groups for example. Although useful where flexibility greater than that of the brittle resins is desired, the cured enamel requires greater flexibility than that engendered by the ammonia condensation: and this can be obtained by employing alkyl substituents on the nuclei, thus:

(2)

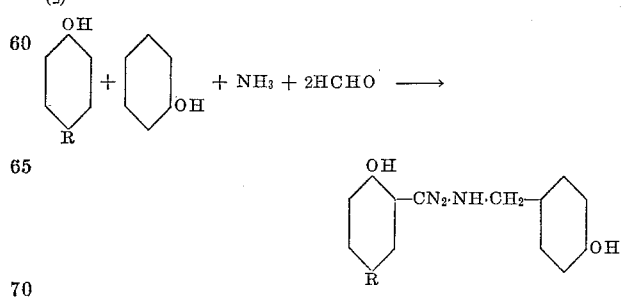

Noting that in Equations 1 and 2, the link attaches to one nucleus at ortho position relative to the hydroxyl, and to the other at para position. In Equation 2, the alkyl group R is located in para position relative to the hydroxyl in the original alkyl phenol. This alkyl group R can contain 6 to 12 carbon atoms, and usually is present as a branched radical.

In practice, flexibility can be attained by the employment of alkyl phenols in substitution for the simple phenol, in condensing the phenols with formaldehyde in the presence of sodium hydroxide or other alkaline catalysts: but the substitution can only be partial, because the cross-linkage during final curing is restricted by the alkyl groups. According to the present invention, the proportion of alkyl phenol can be kept low, and the desired flexibility attained by the provision of $$\cdot CH_2 \cdot NH \cdot CH_2 \cdot$$

linkages: that is, desirable resin coatings can be attained by internal plasticization both between adjacent aromatic nuclei and by the employment of substitutions on the nuclei.

In the following series of preparations, the phenol component was modified by inclusion of an alkyl phenol, with varying amounts of ammonia:

*TABLE I*

COMPOSITIONS

|  | I | II | III | IV | V | VI |
|---|---|---|---|---|---|---|
| Phenol | 1.0 | 1.0 | 1.0 | 1.0 | 1.0 | 1.0 |
| Octyl phenol | None | 0.15 | 0.3 | 0.5 | 0.9 | 1.8 |
| Formaldehyde | 3.0 | 3.45 | 3.9 | 4.5 | 4.75 | 6.6 |
| Ammonia | 3.0 | 3.45 | 3.9 | 4.5 | 2.40 | 1.7 |

REACTION CONDITIONS

| Temp., °C | 90 | 90 | 80-90 | 90 | 80-85 | 90-95 |
|---|---|---|---|---|---|---|
| Time, hrs | 2 | 5 |  | 20 | 16 | 20 |
| Solvent | MCS | MCS | AA | AA |  |  |

BEHAVIOR

| Gel Time | 530 | 700 | 700 | 500 | TP | TP |
|---|---|---|---|---|---|---|
| Cure | Hi-T | Hi-T | Flame | Flame |  |  |
| Film Wt |  |  | 1.5 | 0.7 |  |  |
| Fab. Control |  |  | 75 | 75 |  |  |
| Fab. Enamel | 0 | 65 | 75 | 70 |  |  |
| Soft, Control |  |  | 0 | 0 |  |  |
| Soft, Enamel | 0 | 0 | 0 | 0 |  |  |
| Stain, Control |  |  | 0.4 | 0.4 |  |  |
| Stain, Enamel | 0 | 0 | 0.5 | 1.1 |  |  |
| Percent Alkyl Plast | 0 | 10 | 18 | 24 | 31 | 38 |

In the above table, the proportions are by weight: "MCS" designates methyl Cellosolve, "AA" amyl alcohol, "Hi-T" a high temperature oven treatment for curing, "flame" a flame treatment for curing: and "TP" a thermoplastic behavior. The "gel time" is stated in seconds, at 130 degrees C. The "film wt." indicates the film weight in milligrams per square inch. "Fab. control" indicates the behavior of reference or control specimens of tinplate coated with phenol-cresol-formaldehyde condensates: and "fab. enamel" indicates such behavior where the tin plate received a coating of the prepared compositions. "Soft" indicates the softening of the coating of a reference enamel ("control") and of the prepared composition ("enamel"). "Stain" similarly indicates the staining of such coatings. "Percent alkyl plast." indicates the weight percentage of the alkyl substitute group, based on the polymer produced.

The standard conditions for tests of "soft" and "stain" values as set out above are to coat the tin plate with an optimum amount of enamel (1.5 to 2.4 milligrams per square inch) and baked under optimum conditions (8 to 10 minutes at 385° F.), and cut to strips 0.5 by 4.0 inches: these strips for the enamel under test and the control enamel are then inserted into a can of dog food in such a manner that both enamel surfaces are in contact with the dog food; the can is sealed and processed at 250° F. for 90 minutes and then allowed to cool to room temperature overnight; the can is opened; and the strips removed, washed with cold water, and immediately tested for softness by scratching with the thumb or finger nail. The softness of the film or coating is rated by numbers; where "0" means no observable impression under heavy pressure, "1" a barely observable impression very difficulty formed, "2" a minor impression formed with difficulty, "3" a moderate impression formed with moderate force, "4" a deep impression which is easily formed, "5" a very soft condition where no effort is required to displace the material.

Upon inspection of the specimens subjected to the above processing in dog food: with ratings by numerical values where "0" means no staining, "1" a very slight staining, "2" a slight staining, "3" a moderate staining, "4" a high staining, and "5" a very heavy staining. This dog food test is simple to perform, and permits easy and significant comparisons: it is similar to so-called "fat softening" and "sulfide staining" tests.

From Table I, it will be noted that compositions I, without alkylphenol and with a 1:3 ratio of formaldehyde and a 1:3 ratio of ammonia, produced a brittle coating whereby the coated metal could not be fabricated without breakage and loss of coating. When (composition II) the phenol component was one part of monohydroxybenzene (simple phenol) and 0.15 part of octyl phenol, being a ratio of 100:15, or an alkyl percentage of 10, with the same 1:3 ratio of formaldehyde and ammonia to total phenol, the coated plate could be fabricated with a result closely equivalent to that with commerical enamels used for can ends. In composition III, where the phenol:alkyl phenol ratio is 1.0 to 0.3 with the alkyl percentage 18, a like fabrication ability is noted. In composition IV, where the phenol:alkyl phenol ratio is 1.0 to 0.5 with the alkyl percentage 24, a good fabrication also results. When the content of alkyl phenol is further increased, so the percentage is 31 (composition V) or 38 (composition VI), the product is thermoplastic, even though the amount of ammonia is reduced below the 1:3 ratio of compositions I-IV. Thus, a desirable range with the octylphenol employed is that where the percentage of alkyl substitution is from 10 to 24.

It is probable that the chains and linkages have the simple and alkyl phenol groups present at intervals which average in spacing corresponding to the ratio of these components. Thus, considered as a chain, composition IV probably has about every third phenyl group with the alkyl substitution thereon; whereas each two adjacent phenol groups are connected by the nitrogen-containing linkage stated above.

In general, the effect of four methylene amine groups between phenol nuclei appears approximately equivalent to one alkyl group, e.g. nonyl or octyl. Thus, a phenolic resin from monohydroxybenzene and formaldehyde with sodium hydroxide catalyst will be brittle: with ammonia as a condensing agent, the production of $\cdot CH_2 \cdot NH \cdot CH_2 \cdot$ links instead of $\cdot CH_2 \cdot$ links confers sufficient plasticity or flexibility for purposes where severe stretching will not occur, but not sufficient for use as enamel on a can part which will later be bent and stretched as in forming can ends, side seams, and double end seams. On the other hand, when a 50:50 molecular ratio of such monohydroxybenzene and monohydroxy-alkylbenze is condensed with formaldehyde by sodium hydroxide, triethylamine, etc.; the presence of alkyl groups upon every other phenol nucleus, on the average, can result in a weaker cross-linkage and undesirably high thermoplasticity, i.e., tackiness, when heated. By employing ammonia in large excess during the condensation of a 75:25 molecular ratio of phenol:alkylphenol, the resulting cured material is of thermoset type, resistant to softening, and yet having the fabrication flexibility or plasticity required.

The alkyl phenol can be selected from the group of monohydroxyphenols having a substitution of a carbonhydrogen, i.e. straight or branched chain alkyl, group of eight to eighteen carbon atoms. Excessive impurities of dialkyl phenols should be avoided. Mixtures of monoalkyl phenols are usable. Nonyl and octyl phenols with less than 2 percent of dialkyl impurities are commercially available and can be used with results as in Table I above. These commercial alkyl phenols have the monoalkyl groups largely in para position relative to the hydroxyl.

The illustrative practices are not restrictive; and the invention can be employed in many ways within the scope of the appended claims.

What is claimed is:

1. A method of preparing a phenolic resin composition which comprises condensing about 1.0 part-by-weight of a mixture of phenols consisting of monoalkylphenols wherein the alkyl group has 8–18 carbon atoms and monohydroxybenzene with about 3.0 to 4.5 parts-by-weight of formaldehyde and 3.0 to 4.5 parts-by-weight of ammonia at a temperature ranging from about 80°–100° C. for a period of about 2 to 20 hours in the presence of an alkaline condensation catalyst; said mixture of phenols consisting of about 0.15 to 0.5 part-by-weight of the alkylphenol for every part-by-weight of the monohydroxybenzene.

2. The method of claim 1 further characterized in that the monoalkylphenol is a para-alkylphenol wherein the alkyl group has 6–12 carbon atoms.

3. The method of claim 1 further characterized in that both the formaldehyde and ammonia are present in an amount of about 3 parts-by-weight for every part-by-weight of the mixture of phenols.

4. The method of claim 3 further characterized in that said mixture of phenols consists of about 0.5 part-by-weight of the alkylphenol for every part-by-weight of the monohydroxybenzene.

5. The method of claim 1 further characterized in that the monoalkylphenol is a mixture of monoalkylphenols substantially free of dialkyl phenols.

6. A fluid coating composition comprising a volatile organic solvent and an effective amount of the phenolic resin composition of claim 1.

References Cited by the Examiner
UNITED STATES PATENTS 2,736,718  2/1956  Webber _____ 260—53

FOREIGN PATENTS 603,223  6/1948  Great Britain.
664,527  1/1952  Great Britain.

OTHER REFERENCES

Zinke et al.: "Zur Kenntnis des Hartungsprozesses von Phenolformaldehydharzen," University of Graz, Austria, 1950, pp. 1098–1107 (C.A. 45; 9911g).

Zinke: Journal of Applied Chemistry, vol. 1, Issue 6, June 1951, pp. 257–266.

WILLIAM H. SHORT, *Primary Examiner.*

P. E. MANGAN, *Examiner.*